United States Patent [19]
Monaghan

[11] Patent Number: 5,889,598
[45] Date of Patent: *Mar. 30, 1999

[54] GRAPHIC WORKS INVOLVING HOLOGRAPHY

[75] Inventor: Brian J. Monaghan, Glenside, Pa.

[73] Assignee: Pennsylvania Pulp and Paper Co., Glenside, Pa.

[*] Notice: The term of this patent shall not extend beyond the expiration date of Pat. No. 5,706,106.

[21] Appl. No.: 884,596

[22] Filed: Jun. 27, 1997

Related U.S. Application Data

[63] Continuation of Ser. No. 452,581, May 25, 1995, Pat. No. 5,706,106.

[51] Int. Cl.$^6$ .............................. G03H 1/00; B31F 1/07; B29D 7/01; B41M 3/12
[52] U.S. Cl. ................................... 359/1; 359/12; 40/616; 101/3.1; 101/486; 264/1.34; 427/147; 427/258
[58] Field of Search ................................... 359/1, 2, 3, 12; 40/124.1, 596, 616, 629; 101/3.1, 4, 33, 34, 486; 264/1.31, 1.34; 427/7, 147, 258, 289

[56] References Cited

U.S. PATENT DOCUMENTS

| | | |
|---|---|---|
| 4,421,380 | 12/1983 | McGrew . |
| 4,500,374 | 2/1985 | Nakazima . |
| 4,681,324 | 7/1987 | Karabed . |
| 4,684,795 | 8/1987 | Colgate, Jr. . |
| 4,838,965 | 6/1989 | Bussard . |
| 4,913,504 | 4/1990 | Gallagher . |
| 4,921,319 | 5/1990 | Mallik . |
| 4,933,120 | 6/1990 | D'Amato et al. ..................... 264/1.34 |
| 4,940,301 | 7/1990 | Sallai . |
| 4,971,646 | 11/1990 | Schell . |
| 4,978,593 | 12/1990 | Yin . |
| 4,979,422 | 12/1990 | Belli . |
| 5,056,880 | 10/1991 | Barbanell . |
| 5,083,850 | 1/1992 | Mallik ..................................... 359/1 |
| 5,142,384 | 8/1992 | Wood . |
| 5,262,879 | 11/1993 | Davis . |
| 5,267,753 | 12/1993 | Chock . |
| 5,313,886 | 5/1994 | Müller ................................... 101/486 |
| 5,318,807 | 6/1994 | GiliPicoy ............................... 101/3.1 |
| 5,517,336 | 5/1996 | Moleé ..................................... 359/1 |
| 5,585,144 | 12/1996 | Waitts .................................... 427/258 |
| 5,706,106 | 1/1998 | Monaghan ............................... 359/1 |

OTHER PUBLICATIONS

Excerpts from Conference Proceeding, Pira International, 16–17, Nov. 1994—Papers #5 and 14.

Primary Examiner—Cassandra Spyrou
Assistant Examiner—Darren E. Schuberg
Attorney, Agent, or Firm—Volpe and Koenig, P.C.

[57] ABSTRACT

A substrate bears holographic imagery, selected portions of which are covered by non-holographic imagery printed in predetermined geometric registry with the holographic images. Multiple replicas of this interactive graphic work are mass-produced by embossing an array of the holographic imagery into a substrate in roll form, together with eyemarks located periodically along the roll. Using these eyemarks, the roll is optically sheeted and the non-holographic imagery then printed on the holographic substrate.

10 Claims, 4 Drawing Sheets

GRAPHIC WORKS INVOLVING HOLOGRAPHY

This is a continuation of application Ser. No. 08/452,581, filed May 25, 1995, now U.S. Pat. No. 5,706,106, issued on Jan. 6, 1998. The present application is by the same inventor and is assigned to the same assignee as its above-identified parent application.

BACKGROUND OF THE INVENTION

The present invention relates to graphic works which involve the use of holography, the process of producing such works, and the products resulting therefrom.

It is well known that holography can be used to produce graphic works which provide visual effects that are unusual, in the sense that they cannot readily be created by other image-forming techniques. In particular, graphic works, such as greeting cards, playing, or trading cards, wrapping paper, and a host of other paper or plastic based products have been equipped with holographic images to enhance their visual interest and appeal. This enhancement is thought to stem from the variegated visual impressions which holograms produce when viewed from different perspectives or under different lighting conditions.

It is also known to "combine" holograms with conventional (non-holographic) images on the same over-all graphic work, in the sense that a hologram is created on one portion of the work, while other portions have (non-holographic) printing applied to them. A classic example of this is provided by some credit cards or other kinds of identification cards, on which a hologram appears on a portion of the surface—often for security purposes—while other portions bear conventional printed material.

BRIEF DESCRIPTION OF THE INVENTION

I have now found that the visual impact of graphic works which display both holographic and non-holographic images can be still further enhanced, beyond what the prior art had achieved in that regard.

Accordingly, it is an object of my invention to provide such a further enhancement.

It is another object to provide a process of producing graphic works which exhibit this enhancement.

It is still another object to provide the finished graphic works featuring my enhancement.

These and other objects which will appear are achieved in accordance with my invention by providing graphic works which bear holographic imagery, and in which selected portions of these holographic images are, in turn, covered by non-holographic imagery located in predetermined geometric registry with the holographic images.

This creates an "interactivity" between the holographic and non-holographic imagery that provides a wholly new and unexpected visual effect. In particular, the portions which are not holographic are essentially equally noticeable independently of lighting or viewing conditions and thereby capture the viewer's initial attention. At the same time, their location in predetermined registry with the holographic portions draws attention to the latter and leads viewers to receive the full interactive impact of both.

The non-holographic imagery is formed of printing inks whose light transmissivity can range from translucent to opaque and whose hue can span the entire range of colors, as well as white, black, and shades of gray.

Graphic works utilizing this invention have a visual impact which I believe to be due to the above-mentioned "interactive" visual effect which they create.

Having recognized the foregoing, I further recognized that practical applications of the invention would require producing the same interactive imagery not just once or twice but in mass produced replicas, running typically into the thousands, tens of thousands, or even greater numbers of copies. Accordingly, I have further devised a mass production technique which readily provides such large quantities of copies, without compromising the desired registry between holographic imagery and the superposed non-holographic imagery.

This is accomplished in accordance with the present invention as follows.

The holographic imagery is produced in the desired multiple copies in roll form. Along the roll there are provided so-called eyemarks, i.e. optically distinctive markings which occupy predetermined geometrical positions in relation to the remainder of the holographic imagery. Then, before superposing the non-holographic imagery, the roll is optically sheeted, i.e. cut into separate sheets. In so doing, the eyemarks are utilized to insure that the multiple copies of the holographic imagery occupy, on each separate sheet, the same positions relative to the outer edges of that sheet. The non-holographic imagery is then printed on the holographic background by conventional sheet printing techniques. In this way, there is preserved the desired registry between holographic and non-holographic imagery over mass-production runs.

It should be noted that the term "registry" is not intended to be limited to geometric coincidence between holographic and non-holographic imagery portions. Rather, this is a shorthand expression used to denote the fact that there exists some predetermined geometrical relationship between these portions, and this relationship is maintained throughout mass-production of multiple replicas of the graphic work.

BRIEF DESCRIPTION OF THE DRAWINGS

For further details, reference is made to the discussion which follows, in light of the accompanying drawings, wherein.

The same reference numerals designate similar elements in the different figures.

DETAILED DESCRIPTION OF THE PREFERRED EMBODIMENTS

Figure 1:
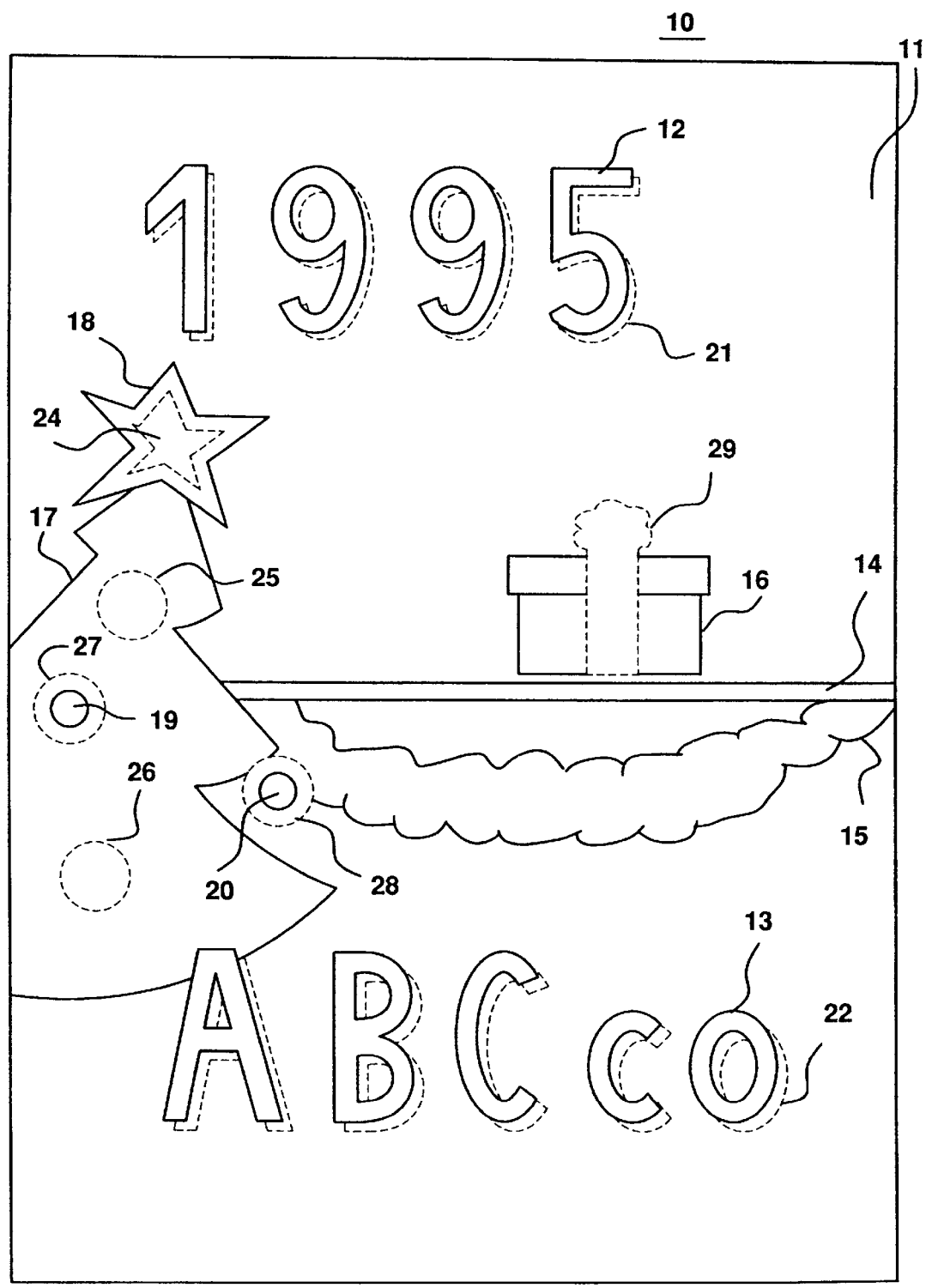
FIG. 1 is a diagrammatic illustration of a single copy of a graphic work embodying the present invention.

Referring now to FIG. 1, this shows a greeting card 10, constituting a single copy of an illustrative graphic work mass-produced in accordance with the present invention.

The over-all surface 11 of this card 10 is constituted by holographic imagery. Superposed on selected portions of this over-all holographic surface 11 there are portions of imagery which are not holographic. Dealing first with these non-holographic portions, they consist of all those which are outlined in solid lines in FIG. 1. That includes the four solid-line numerals 1, 9, 9 and 5 which are positioned near the top of the card 10 and which are collectively designated by reference numeral 12 in FIG. 1, and the five solid-line letters A, B, C, C and O which are positioned near the bottom of the card and which are collectively designated by reference numeral 13. The non-holographic portions also include a shelf-like structure 14, a curved portion 15 resembling a suspended Christmas wreath, and a box-like element 16 on shelf 14. Also non-holographic is the element 17 which has the outline of a Christmas tree, the star-shaped element 18 at the top of tree 17 and the two circular portions 19 and 20 associated with the Christmas tree outline 17.

Turning now to the holographic surface 11, this can consist of a uniform hologram, except in certain positions discussed below.

Specifically, the surface 11 includes portions 21 which have the same shapes as the numerals 1, 9, 9 and 5, respectively, which are superposed on surface 11 as previously described. These holographic portions 21 are so located within the surface 11 that small parts of each protrude from behind the corresponding numerals 1, 9, 9 and 5. These protruding parts of holographic portions 21 are outlined by broken lines in FIG. 1.

Likewise, the surface 11 includes portions 22 which have the same respective shapes as the letters A, B, C, C and O. Small parts of portions 22 protrude from behind these letters and these protruding parts are also outlined by broken lines in FIG. 1.

The remainders of the distinct holographic portions 21 and 22 are concealed behind superposed portions 12 and 13, respectively.

Enclosed within solid-line star-shaped portion 18 there is shown a smaller, also generally star-shaped portion 24, enclosed by a broken line. This portion 24 symbolizes a part of the holographic surface 11 which does not have non-holographic imagery superposed upon it; therefore, the holographic surface 11 is exposed within the area defined by broken-line star 24.

Irregularly rounded areas 25 and 26 enclosed by broken lines also represent parts of holographic surface 11 on which non-holographic imagery has not been superposed, so that the holographic surface remains exposed within these areas 25 and 26.

The same applies to the rounded annular areas 27 and 28 which are enclosed by broken lines and which respectively surround superposed portions 19 and 20.

Finally, box 16 is vertically divided by a portion 29 defined by broken lines and ending in a bulge above the box. This also represents an area in which there is nothing superposed on the holographic surface 11, which therefore remains exposed within portion 29.

Consider now the visual impact of greeting card 10 and its various elements.

First, it is obviously a greeting for Christmas 1995 from the ABC Company.

This significance is immediately conveyed by portions 12 through 20. Since these portions are non-holographic, that perception is not dependent on any particular lighting conditions or viewing directions.

The exposed holographic portions then interact with these non-holographic portions to greatly enhance the over-all visual impact.

The holographic character of the general exposed surface 11 gives a shimmering, sparkling over-all appearance within which the non-holographic portions stand out conspicuously, and vice versa.

The exposed distinctive holographic portions 21 and 22, which edge the year-date numerals 12 and the company name symbols 13, again "set off" interestingly those particular design elements.

The exposed holographic portion 24 provides what is perceived as a lighted center to the otherwise non-holographic star 18 which ornaments the peak of the Christmas tree 17.

The exposed holographic portions 25 and 26 create the impression of Christmas tree lights.

The exposed holographic portions 27 and 28 which surround the superposed portions 19 and 20, respectively, create, together with these surrounded portions 19 and 20, the impression of the shiny balls which are frequently used as Christmas tree ornaments.

Finally, the exposed holographic area 29 creates the impression of a ribbon and bow for the non-holographic remainder of box 16.

As more fully discussed below, the superposition of elements 12 through 20 on selected portions of the surface 11 is accomplished by printing these superposed elements on top of surface 11. In so doing, different colors and print densities may be used. For example, the numerals 12 and the letters 13 may be printed in opaque black. The Christmas tree 17 and the wreath 15 may be printed in opaque green, the shelf 14 in opaque beige, and the box 16 in opaque red. On the other hand, the portions 19 and 20 forming the cores of ornamental balls may be printed in slightly translucent yellow, so as to produce a golden, sparkling impression, in interaction with the holographic surface 11 which then becomes partially visible through the translucent printing.

The superposed (printed) star-shaped portion 18 may be printed in an opaque gold color.

It should be noted that, in practical offset printing, opaque white and screens thereof are utilized to create various desired opacities.

In a black and white drawing such as FIG. 1, it is difficult to do justice to the visual impact created by the interactivity between holographic and non-holographic portions in registry. In the "real world" that impact is nothing short of stunning.

It will now also be appreciated how important it is that there be achieved the predetermined geometrical relationship, or registry, between the printed elements and the holographic elements on which they are superposed. For example, a substantially different geometrical relationship between the printed numerals 12 and the holographic numerals 13 on which they are partly superposed, would create a visual impression quite different from that which was intended. As another example, if the holographic ribbon and box 29 were not in the registry with the appropriate portions of non-holographic box 16, the desired interactive effect would be lost. And so on for other elements of the product.

Figure 2:
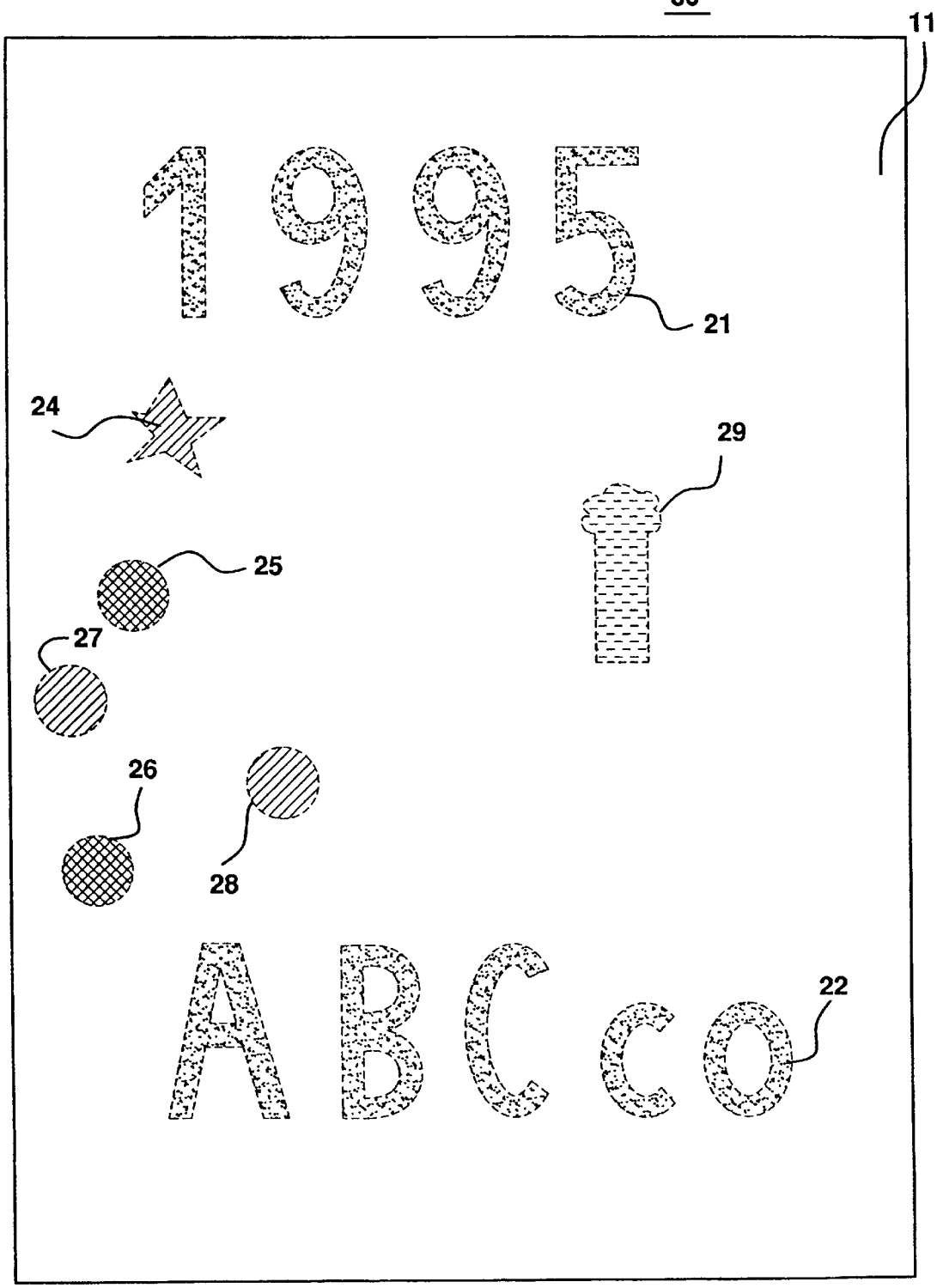
FIG. 2 is a diagrammatic illustration of the holographic imagery on a single copy of the graphic work of FIG. 1.

When mass-producing such cards by the thousands in accordance with the invention, the maintenance of the desired registry becomes a challenge which is met by the present invention as discussed further below. Turning now to FIG. 2, this is a diagrammatic illustration of a hologram 30 which is initially produced in accordance with the invention and which is subsequently processed into the finished product of FIG. 1.

Thus, in FIG. 2, there is visible the entire surface 11 occupied by holographic imagery. The numerals 21 and the letters 22, which were partly concealed behind the corresponding printed symbols 12 and 13 in FIG. 1, are now fully exposed. The stippling on these holographic numerals and letters is intended to represent the fact that they have a distinctly different appearance from other areas of the surface 11, namely what might be called a speckled, rather than a uniform appearance. Similarly, the cross-hatching in portions 24, 27 and 28 is intended to show that these portions have distinctive holographic appearances in which viewing from different angles gives the impression of expanding, or exploding bands of different colors. As for portions 25 and 26, their double cross-hatching represents a sparkling visual effect and the horizontal lines in portion 29 represent a moire visual effect.

Figure 3:
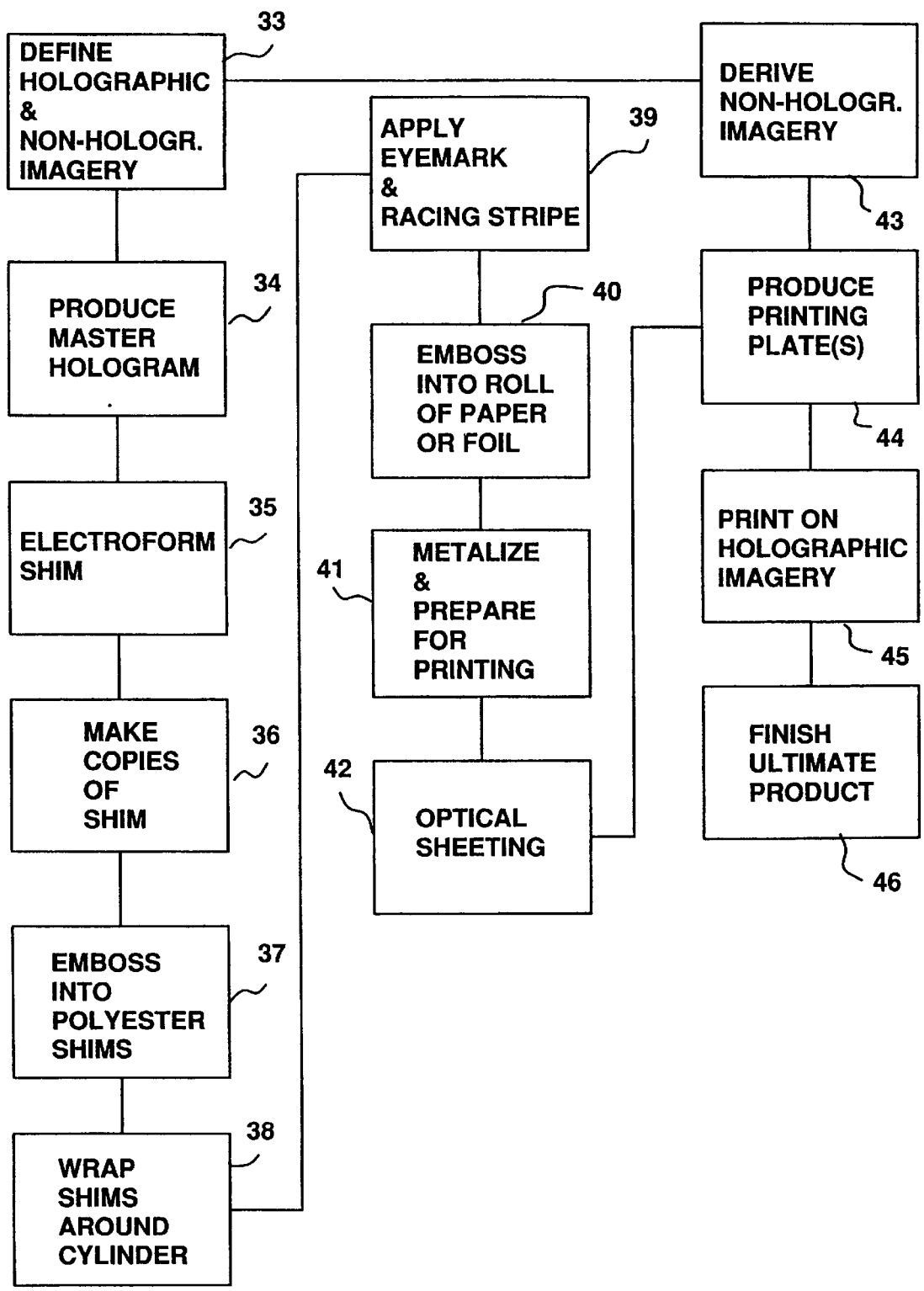
FIG. 3 is a flow diagram of a process embodying the present invention.

Turning now to FIG. 3, this is a flow chart which will be referred to in describing the mass-production process in accordance with the invention.

This process starts with the definition of the imagery which it is desired to produce, partly as hologram and partly as superposed non-holographic images. This initial imagery definition is represented by block 33 in FIG. 3.

From this defined imagery, there is produced a master hologram containing the holographic components of that imagery (block 34 in FIG. 3). This entails exposing a photo-resist layer on a substrate (e.g. a glass plate) to appropriate illumination, thereby creating the physical three-dimensional holographic pattern. From this master hologram, there is produced by electroforming a so-called "shim" (block 35 in FIG. 3) which is typically a nickel sheet whose surface conforms to the holographic pattern on the master. Multiple copies of this shim are then made by electroplating (block 36 in FIG. 3). These shims are mounted on a cylinder which is used to emboss the physical holographic patterns into thin sheets of polyester (block 37 in FIG. 3). Alternatively, the cylinders may be used to emboss the patterns into thin polyester in roll form, which is then cut into separate sheets. Those polyester sheets form the ultimate shims for embossing the holographic patterns into the paper which typically constitutes the image bearing material of the end product.

To that end, these polyester shims are wrapped around an embossing cylinder (block 38 in FIG. 3). Typically, there are used a sufficient number of such embossing shims as are needed to cover a cylinder which may have a circumference of, say, 36 inches and a width of several feet. The actual dimensions will depend upon the dimensions of a single holographic surface 11 (FIGS. 1 and 2). A cylinder should be used whose circumference just matches an integral multiple of one orthogonal dimension (e.g. the height) of surface 11 and whose width is somewhat greater than an integral multiple of the other orthogonal dimension (e.g. the width) of surface 11.

There are then mounted on the cylinder enough embossing shims to fill its circumference, while leaving uncovered a strip at each end of the cylinder. On these uncovered end strips of the cylinder there are then mounted so-called "racing stripes". These are uniform strips of holographic material paralleling the lateral edges of the shims corresponding to surfaces 11. On one of the uncovered ends, there is further provided a so-called "eyemark". That is an area of distinctive holographic material which is generally rectangular, and which extends parallel to the longitudinal axis of the cylinder. It may be incorporated into the same strip of material which bears the racing stripe, or it may be a separate piece. See block 39 in FIG. 3.

Figure 4:
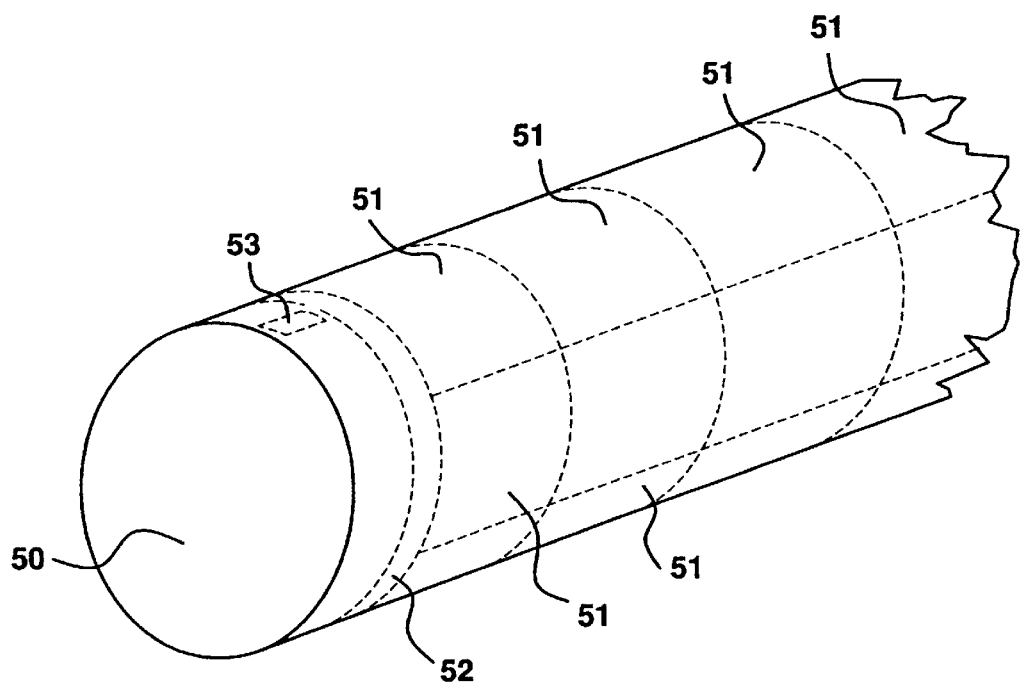
FIG. 4 is a diagrammatic fragmentary illustration of apparatus used in implementing the process of the invention.

FIG. 4, to which reference may now be made, is a diagrammatic illustration, not to scale, of a fragment of the apparatus described above with reference to blocks 38 and 39 in FIG. 3. It shows the embossing cylinder 50, the multiple copies 51 of the embossing shim mounted on its circumference, one of the racing stripes 52 and the eyemark 53.

This apparatus of FIG. 4 is then used to emboss into paper (block 40 in FIG. 3) the holographic patterns mounted on cylinder 50 (FIG. 4). The paper on which this embossing is performed is in roll form, so that large numbers of embossed replicas of the holographic patterns on the cylinder can be rapidly produced.

The embossed paper is then metalized by means of vapor deposition of aluminum and its surface conditioned for later printing-on (block 41 in FIG. 3). Next, and this is a particularly important feature of the inventive process, the metalized paper is optically sheeted (block 42 in FIG. 3). This involves progressively unrolling that paper and operating on it as follows. The racing stripes (see stripe 52 in FIG. 4) are used to guide the lateral trimming of the unrolled paper, in order to compensate for any unintentional lateral displacements which may have crept in during prior production operations. The eyemarks (see eyemark 53 in FIG. 4) are used to control the transverse cutting of the unrolled paper into separate sheets to make sure that this cutting always occurs at the same location relative to the multiple replicas of holographic imagery on the unrolled paper.

In this manner, from the roll of paper, there are prepared multiple separate sheets, each bearing multiple replicas of the same holographic imagery. Most importantly, on each separate sheet the holographic imagery occupies the same geometric position with respect to the outer edges of the sheet.

From the starting design (block 33 in FIG. 3), there is derived (block 43 in FIG. 3) the non-holographic imagery which is to be printed on the holographic imagery produced as described above on the separate sheets. This non-holographic imagery is converted into one or more printing plates (block 44 in FIG. 3) for printing the one or more colors in which the non-holographic imagery is to be applied. Specifically, each printing plate is made by carefully aligning the partial imagery which it is intended to print by means of that plate with those portions of the holographic imagery on which that partial imagery is to be superposed, using for that purpose one of the separate sheets previously produced. The same printing plate is then used (block 45 in FIG. 3) to perform the printing operation on the many sheets bearing these holograms. This is possible without losing the desired hologram-to-print registry because of the above-described process for producing the multiple hologram-bearing sheets, all alike, and all with the holographic imagery always in the same position within the confines of each sheet.

The final operation then involves finishing the ultimate product, e.g. by cutting the sheets into pieces (block 46 in FIG. 3), each piece containing one replica of the holographic surface 11 (FIG. 1) and of the non-holographic imagery 12-20 (also FIG. 1). These pieces constitute the finished product, with holographic and non-holographic imagery in the desired registry.

The importance of the optical sheeting procedure (block 42 in FIG. 3) should be noted. If the paper roll bearing the multiple replicas of the holographic imagery were not optically sheeted, but were simply cut into segments of equal lengths before being printed on, the desired registry between holographic and non-holographic imagery could in practice not be maintained. That is because the geometric relationship between the holographic imagery and the edges of the sheets bearing that imagery could then "wander" from sheet to sheet due to non-uniformities in prior processing steps. As a result, even though the printing plate locations at which printing of partial images is to take place were in good alignment with the holographic imagery on that one sheet by use of which they had initially been aligned, that alignment would not persist with respect to subsequently printed sheets. The holographic and non-holographic imagery would therefore lose registry.

The various process steps described above can all be carried out by known apparatus and techniques. For example, the production of the master hologram (block 34 in FIG. 3) can be performed as disclosed in U.S. Pat. No. 5,262,879, issued Nov. 26, 1993. The contents of that patent are incorporated by reference as if fully set forth herein. A machine for producing this master hologram can be obtained from Dimensional Arts, Inc. of 15730 W. Hardy Street, Suite 300, Houston, Tex. 77060. The steps represented by blocks 35–39 in FIG. 3 can obviously all be performed in known manner. The services of embossing the holographic imagery into paper and then metalizing the paper and preparing it for being printed on (blocks 40 and 41 in FIG. 3) can be purchased from the VanLeer Company of 24 Forge Park, Franklin, Mass. 02038.

The optical sheeting (block 45 in FIG. 3) is a known technique using racing stripes and eyemarks to assure that multiple sheets cut from a roll of paper have edges which always have the same geometrical relationship to the graphic material on each sheet.

Also, only known techniques are involved in deriving the non-holographic imagery, producing the printing plates in the desired registry with the holographic imagery replicas, and using the plates to print on those replicas (blocks 43–45 in FIG. 3). However, it will be noted that the optical sheeting is what makes it possible, in accordance with the present invention, to maintain that registry over many printed sheets.

The printing is preferably carried out through offset printing.

Finally, the cutting of the printed-on sheets into their final individual pieces (block 46 in FIG. 3) is obviously also entirely conventional.

Numerous variations in implementing the invention are possible without departing from the inventive concept.

For example, in order to provide a final product which is stiffer than paper, the roll of paper which bears the embossed holographic surface can be laminated, on the side facing away from the hologram, to a stiffer backing material. This makes the final product suitable for applications such as greeting cards and the like.

On the other hand, for wrapping paper, no lamination is needed. The hologram-embossed paper itself can serve this purpose.

Also, paper is not the only material which can be embossed with the holographic imagery. For example, foils of vinyl, polyester, or biaxially oriented polypropylene (BOPP) can also be embossed as discussed herein (block 40 in FIG. 3). For some applications, the resulting embossed foil material constitutes the final holographic surface on which the subsequent processing in accordance with the invention (blocks 41, etc. in FIG. 3) takes place. For example, insert pages in magazines can be produced in this manner.

In FIG. 3, the application of eyemarks and racing stripes to the embossing cylinder (block 39) has been shown separately from the assembly of the other imagery on that cylinder (blocks 34 to 38). However, it should be understood that these eyemarks and racing stripes can be generated at the very beginning of the processing, namely at the same time and as an integral part of providing the master hologram itself (block 34). This may even be preferable, since it assures accurate positioning of those control elements relative to the remainder of the holographic imagery.

In the above-referenced U.S. Pat. No. 5,262,879, the detailed description deals with the production of a 3-D hologram. However, it is believed to be apparent that the same technique can be utilized to produce 2-D or 2-D/3-D holograms. For the purpose of the present invention, 2-D holograms frequently suffice since these provide an adequate effect of the type which characterizes the invention when used for greeting cards, playing cards, trading cards, wrapping paper, folding cartons, etc.

In view of these and other modifications which will occur to those skilled in the art, it is desired that the scope of the invention be limited only by the appended claims.

What is claimed is:

1. The process of mass-producing a plurality of graphic works all of said works comprising a substrate bearing substantially the same holographic imagery and substantially the same non-holographic imagery superposed by printing on substantially the same portions of the holographic imagery and positioned in substantially the same predetermined spatial relationship to said holographic imagery in all of said works, the process comprising the steps of:

forming a roll of a large number of replicas of said substrate bearing the holographic imagery;

subsequently sheeting said roll into separate sheets such that each sheet is in substantially the same spatial relationship to the replicas of holographic imagery borne by that sheet as every other sheet; and subsequently printing on each said sheet the non-holographic imagery for each said replica.

2. The process of claim 1 wherein said sheeting includes providing said roll with position marks located at predetermined intervals along the roll, and cutting said roll into said sheets under the control of said position marks.

3. The process of claim 2 wherein said position marks are located along the roll with a periodicity which substantially equals the periodicity of recurrence of a predetermined number of said replicas along the roll.

4. The process of claim 2 further comprising initially producing a master hologram of said holographic imagery, deriving a plurality of shims from said hologram, mounting an array of said shims, together with at least one position mark on an embossing cylinder, and using said cylinder to emboss a plurality of said holograms into a substrate in roll form.

5. The process of claim 4 further comprising aligning non-holographic imagery portions of the graphic works with the holographic portions on a given sheet, producing a printing plate from said aligned non-holographic portions, and utilizing said plate to print said non-holographic portions on said holographic portions on a plurality of said sheets in succession.

6. The process of claim 1, wherein said roll is provided with lateral position marks and said lateral position marks are used to guide edge trimming of the sheets so as to enhance the sameness of said spatial relationship.

7. The process of claim 1, wherein the same printing plate is used to print said non-holographic portions on a plurality of said sheets.

8. The process of claim 1, wherein the holographic imagery on each sheet has different portions providing distinct holographic appearances and the non-holographic imagery also has different portions in predetermined visual interaction with respective holographic portions.

9. The process of mass-producing a plurality of interactive graphic works all of said works comprising a substrate bearing substantially the same holographic imagery, and substantially the same non-holographic imagery superposed by printing-on substantially the same portions of the holographic imagery and positioned in substantially the same predetermined spatial relationship to said holographic imagery in all of said works, at least some portions of said printed imagery being positioned so as to interact graphically with portions of the holographic Imagery to form an integral part of a composite holographic and non-holographic image, the process comprising the steps of:

forming a roll of a large number of replicas of said substrate bearing the holographic imagery;

subsequently sheeting said formed roll of replicas into separate sheets such that each sheet is in substantially the same spatial relationship to the replicas of holographic imagery borne by that sheet as every other sheet; and subsequently printing on each said sheet the non-holographic imagery for each said replica in predetermined spatial relationship to said holographic imagery.

10. The process of mass-producing a plurality of graphic works all of said works comprising a substrate bearing substantially the same holographic imagery, and substantially the same non-holographic imagery superposed by printing-on substantially the same portions of the holographic imagery and positioned in substantially the same predetermined spatial relationship to said holographic imagery in all of said works, the process comprising the steps of sheeting a roll of a large number of replicas of said substrate bearing the holographic imagery into separate sheets such that each sheet is in substantially the same spatial relationship to the replicas of holographic imagery borne by that sheet as every other sheet; and subsequently printing on each said optically sheeted sheet the non-holographic imagery for each said replica in predetermined spatial relationship to said holographic imagery.

* * * * *